June 29, 1937.  A. KOLSTRAND  2,085,320
TROLLING RUBBER
Filed Nov. 20, 1933
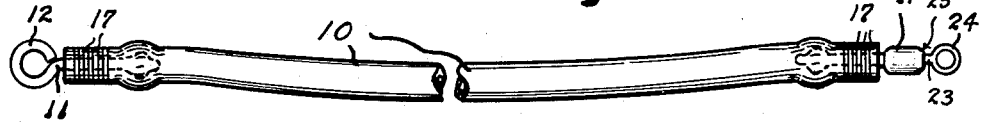
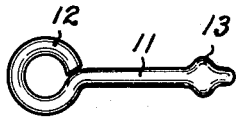
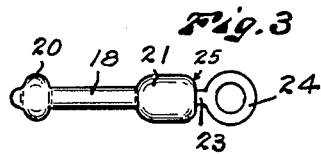
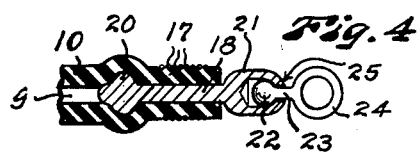
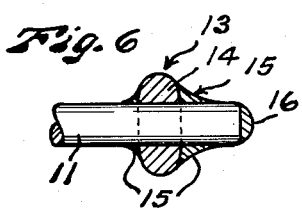
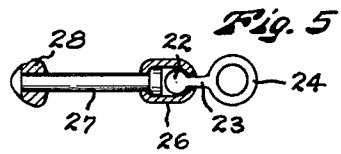
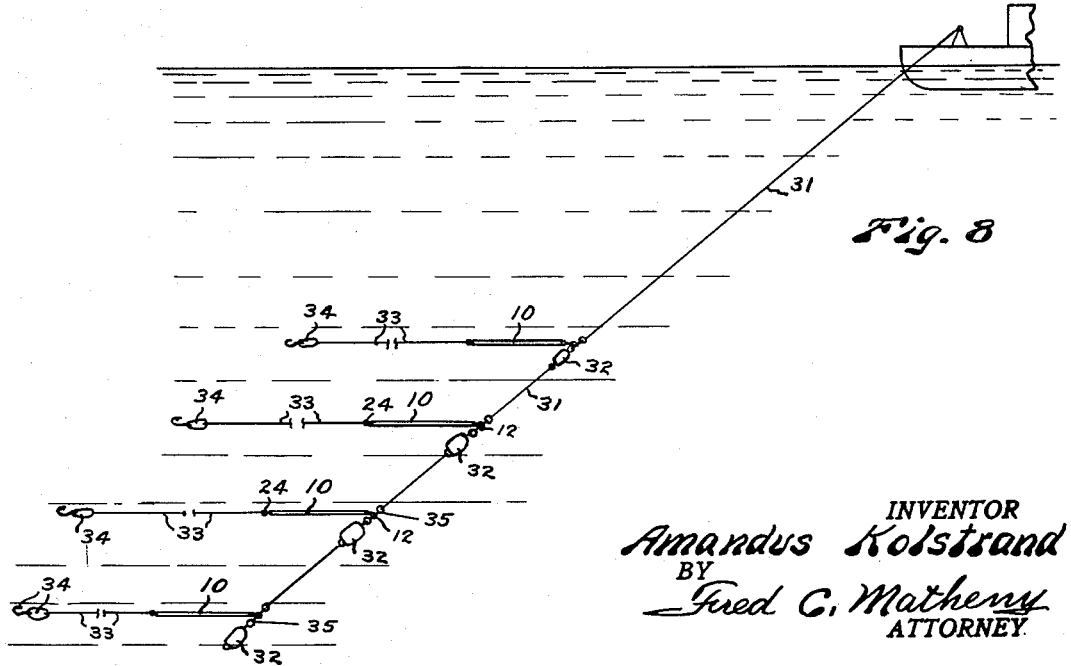
INVENTOR
Amandus Kolstrand
BY
Fred C. Matheny
ATTORNEY Patented June 29, 1937

2,085,320

UNITED STATES PATENT OFFICE 2,085,320

TROLLING RUBBER

Amandus Kolstrand, Seattle, Wash.

Application November 20, 1933, Serial No. 698,826

10 Claims. (Cl. 43—28)

My invention relates to fishing gear of the type commonly termed a trolling rubber and the general object of my invention is to simplify and increase the efficiency of devices of this nature and to render the same more satisfactory in operation.

In trolling with hook, leader and line for large fish, as salmon, it is common practice to connect the leader with the line by an elastic device which is known in the art as a "trolling rubber" and is sometimes called a "rubber trolling spring". The usual trolling rubber is formed of a piece of rubber tube, usually of relatively large diameter and low tensile strength, having a double eye member or swivel inserted into each end of the tube and securely tied or fastened to the tube with one eye portion of each swivel inside of the tube and the other eye portion of each swivel outside of the tube and having the eye members which are positioned within the tube connected with each other by a relatively strong tie member as of twine which is disposed within the rubber tube and is substantially longer than the rubber tube is when said rubber tube is contracted. The usual rubber tube is not strong enough to withstand the pull of a large fish and the object of the tie member is to form a stop means to limit the amount of stretching or elongation of the rubber tube and thus prevent breaking of the tube when a hard pull is exerted on the leader by a fish. The effect of this tie member is often objectionable in that it abruptly checks the extension or stretching of the rubber tube, when a fish takes the hook and exerts a pull on the line. This abrupt check in the stretching of the tube produces a jerk on the mouth of the fish which may tend to tear the hook out of the mouth of the fish and may cause the fisherman to lose the fish.

It is an object of my invention to provide a trolling rubber of this nature which, unaided and without being reinforced will withstand as great a pull as the line and leader are capable of withstanding without breaking and without producing any sharp jerk on the mouth of the fish when the fish takes the hook and starts to resist capture.

Another object of my invention is to provide improved fittings of neat and compact construction for use in connection with a trolling rubber of this nature, one of said fittings being in the nature of a shank having a knob on one end and an eye on the other end and the other fitting being in the nature of a shank having a knob on one end and a combined swivel and eye member on the other end, the combined swivel and eye member being constructed so that they are permanently maintained in substantial alignment with the shank whereby they may serve as hand hold means to facilitate the insertion of the knob end of the fitting into the tube.

Other objects of the invention are to provide a trolling rubber which is smaller in diameter than the usual trolling rubber and is consequently neat in appearance, less visible in the water, easier to handle and offers less frictional resistance in the water thereby making it possible to use less lead on the trolling lines.

Other and more specific objects of the invention will be apparent from the following description taken in connection with the accompanying drawing.

In considering this invention it should be borne in mind that this trolling rubber is used in commercial trolling in relatively deep water where it is common practice for two men in a power operated trolling boat to have out as many as eight main trolling lines with four trolling rubbers, leaders, spoons and hooks, on each main line, making a total of thirty-two hooks out at one time. When four hooks are thus connected with each main line it is a frequent occurrence to have two or more fish hooked on a single main line at one time and as these fish will sometimes run in opposite directions it is very desirable to have a strong and reliable and highly elastic trolling rubber between each hook and the main line.

In the drawing Figure 1 is an elevation of a trolling rubber constructed in accordance with my invention.

Fig. 2 is a detached elevation of an eye member used in connection with the invention.

Fig. 3 is a detached view in elevation of a combined eye member and swivel constructed in accordance with this invention.

Fig. 4 is a longitudinal section of the combined eye member and swivel shown in Fig. 3 and also showing a fragment of the rubber tube in which the device is disposed.

Fig. 5 is a detached view partly in elevation and partly in section of a modified form of swivel member.

Fig. 6 is a fragmentary sectional view, on a larger scale, illustrating one knob construction which may be used on any of my fittings.

Fig. 7 is a fragmentary view partly in section and partly in elevation of a modified form of trolling rubber constructed in accordance with my invention.

Fig. 8 is a somewhat diagrammatic view illustrating the use of this invention.

Referring to the drawing, the numeral 10 designates a tube, usually from twelve to twenty inches long, made from a high grade of tough rubber capable of stretching to several times its initial length and capable of withstanding a relatively great strain without breaking. In practice I prefer to use a tube of from three-eighths to seven-sixteenths of an inch in diameter having a hole through the center of about one eighth of an inch in diameter. This provides a cross sectional area of rubber of from one tenth to one eighth of one square inch and the grade of rubber which I use gives to this tube a tension or breaking strength of not less than two hundred pounds, I prefer to use a tube 10 having a hole 9 through the center into which the end fittings may be inserted but I may use a trolling rubber of the general form shown in Fig. 7 having a non-tubular central portion 40 and tubular end portions 41, the central portion 40 having the desired cross section to afford proper strength and the tubular ends 41 being axially recessed to receive the fittings. These fittings may, in some instances, be vulcanized into the ends 41.

The fittings preferably consist of a connector eye at one end of the rubber tube and a swivel at the other end, see Fig. 1. The connector eye, Fig. 2, comprises a shank 11, bent at one end to form an eye member 12 and having a knob like portion 13 adjacent the other end. The knob-like portion 13, may be made, as shown in Fig. 6, by slipping a short section 14 of tubular metal over the shank 11 then pressing the section 14 of metal in a die to form the same round in shape and then dipping the same in moulten solder. This causes the solder to firmly and permanently secure the section 14 of tubular metal to the shank 11 and further causes the solder to fill in and round out the spaces at the ends of the metal tube section 14 as indicated at 15 and to round off the end of the shank 11 as indicated at 16 thereby forming a knob of neat appearance and easy curves which has no sharp edges and may easily be inserted into the axial hole in the rubber tube and which will not tend to cut the walls of the tube when in use. After the shank 11 has been inserted in the rubber tube 10 the end portion of the tube above the knob 13 may be wrapped with twine or non-corrosive wire as indicated at 17 so that it will be impossible to pull the connector out of the tube. The knob-like member on the shank 11 may also be made as shown in Fig. 5, by slipping a tubular member 28 over the shank and securing it to the shank by pressing in a die or by spinning.

The swivel shown in Figs. 1, 3 and 4, comprises a shank 18 having a knob member 20 formed adjacent one end and having an integral socket 21 formed on the other end. The socket 21 is adapted for the reception of a knob or ball 22 on the end of a short stem 23 which has an eye member 24 formed thereon. The end of the socket 21 is pressed or spun or crimped inwardly over the ball 22 and fits closely but not tightly around the stem 23, as shown at 25, leaving said stem free to turn but supporting the same in substantial alignment with the shank 18. By making the socket 21 integral or rigid with the shank 18 and supporting the stem 23 and eye member 24 in substantial alignment with said shank 18, I make it relatively easy to grasp the eye member 24 and socket 21 with the fingers for the purpose of inserting the knob end of the shank 18 into the rubber tube 10. The knob 20 of this swivel is shown to be integral with the shank 18 but obviously it may be made by pressing a piece of tube thereover and soldering this piece of tube to the shank as described in connection with the knob shown in Fig. 6, or by slipping a piece of metal tube over the shank and pressing or spinning said piece of metal tube tightly onto the shank without soldering as shown in Fig. 5. In said Fig. 5, I have shown a swivel embodying a shank 27 having a knob of slightly different shape than the knobs 13 and 20 formed thereon by slipping a piece of metal tube 28 thereover and then pressing or spinning this tubular piece 28 tightly and rigidly onto the shank 27 without soldering, the pressing or spinning process also upsetting the end of the shank 27 slightly to prevent forcible removal of the member 28. In Fig. 5 I also show a modified form of swivel in which the socket 26 is formed of a separate piece of metal tube pressed or spun onto the end of the shank 27, either so that the socket 26 is free to turn on the shank 27 or so that said socket 26 is rigid with respect to the shank 27.

In the use of trolling rubbers of this type one or more main fish lines 31 from a boat are provided at intervals with sinkers 32 and the connector eye 12 of one of my trolling rubbers is secured to the main fishing line adjacent each lead sinker 32. A leader 33 is secured to the swivel member at the other end of each trolling rubber and a spoon and hook 34 of any desired form is secured to the end of the leader member. When a fish takes the hook and starts away with it the trolling rubber will yield to the pull and will offer a gradually increasing resistance to the pull without producing an abrupt stop or jerk thus minimizing the tendency to break the tackle or to tear the hook out of the mouth of the fish. The eye member 12 on the trolling rubber is preferably made of ductile metal so that it may be opened up and placed over a spreader bar 35 which is connected with the upper end of each lead sinker 32. To facilitate this method of connection with the main line it is desirable to have an eye member of the form shown in Fig. 2 at one end of the rubber as a swivel does not readily lend itself to this method of connection.

The foregoing description and accompanying drawing clearly disclose a preferred embodiment of my invention but it will be understood that this disclosure is merely illustrative and that such changes in the invention may be made as are fairly within the scope and spirit of the following claims.

I claim:

1. A trolling rubber comprising an elastic rubber tension member having means at the respective ends thereof for connection with fishing lines, said rubber tension member being free and non-restricted between its two ends and relying solely on its own tensile strength to yieldingly resist elongation.

2. An elastic trolling rubber for use in a fish line, embodying a rubber tube, and line connector means secured to the ends of said rubber tube, said rubber tube being non-restricted and free to stretch between said two line connector means and said rubber tube relying solely on its own tensile strength to limit the elongation thereof when a pull is exerted on said tube.

3. An elastic trolling rubber for use in a fish line, embodying a rubber tube, an eye member secured to one end of said tube, and a swivel member secured to the other end of said tube, said tube being unrestricted and free to stretch between said eye member and said swivel and said tube depending solely on its own tensile strength to limit the elongation thereof when a pull is exerted thereon.

4. As an article of manufacture, an elastic trolling unit for use in a fish line, embodying a rubber tube, an eye member secured to one end of said tube, and a swivel member secured to the other end of said tube, said rubber tube being free and non-restricted between its two ends and relying solely on its own tensile strength to yieldingly resist elongation and constituting the sole connection between said eye member and said swivel.

5. As an article of manufacture, an elastic trolling unit for use in a fish line, embodying a rubber tension member having tubular end sections, an eye member secured to one tubular end section of said tension member, and a swivel member secured to the other tubular end section of said tension member, said rubber tube being free and non-restricted between its two ends and relying solely on its own tensile strength to yieldingly resist elongation and constituting the sole connection between said eye member and said swivel, said swivel and said eye member each embodying a shank insertable into the tubular end of said tension member, said shank having a knoblike portion thereon and tie means secured tightly around said tubular portion outwardly from said shank.

6. An elastic trolling member for use in a fish line, embodying a rubber tube, and an eye member secured to one end portion of said tube, said eye member embodying a shank, an eye on one end of said shank, a knoblike portion on the other end of said shank, said shank and said knoblike portion being positioned within said tube, rigid tie means tightly encircling said tube between said knob and said eye, and a swivel member secured to the other end portion of said rubber tube, said rubber tube being free and non-restricted between its two ends and relying solely on its own tensile strength to yieldingly resist elongation and constituting the sole connection between said eye member and said swivel member.

7. An elastic trolling member for use in a fish line, embodying a rubber tube, and a swivel member secured to one end of said tube, said swivel member embodying a shank having a knob portion adjacent one end thereof insertable into the tube, a socket rigid with the other end of said shank, a stem having a ball thereon rotatably held in said socket, said stem having an eye portion external to said socket, and an eye member secured to the other end of said rubber tube, said rubber tube being free and non-restricted between its two ends and relying solely on its own tensile strength to yieldingly resist elongation and constituting the sole connection between said swivel member and said eye member.

8. An eye member for use on a fish line, said eye member embodying a shank, an eye rigid with one end of said shank, and a rigid knob portion adjacent the other end of said shank, said knob portion having an end of reduced size in prolongation of said shank facilitating the insertion of said knob member into the end of a tubular member.

9. In trolling means a swivel member for use on a tubular trolling rubber, said swivel member embodying a shank, a relatively fixed knob portion of larger diameter than said shank on said shank adjacent one end thereof adapted to be inserted into the end of the tubular trolling rubber to connect the swivel member with the rubber, a socket connected with the other end of said shank, said shank being of substantial length between said knob and said socket, and a swivel eye rotatively held in said socket.

10. In trolling means, a swivel member for use on a tubular trolling rubber, embodying a shank, an integral knob portion of larger diameter than said shank on said shank adjacent one end thereof adapted to be inserted into the end of the tubular trolling rubber to connect the swivel member with the rubber, an integral socket of larger diameter than said shank on the other end of said shank, said shank being of substantial length between said knob and said socket, and a swivel eye rotatively held in said socket, said swivel eye and said socket being maintained in substantial alignment with said shank whereby a substantial hand hold means is formed on the end of said shank.

AMANDUS KOLSTRAND.